(12) United States Patent
Shafrir et al.

(10) Patent No.: US 6,651,050 B2
(45) Date of Patent: Nov. 18, 2003

(54) CO-PRESENCE DATA RETRIEVAL SYSTEM WHICH INDICATES OBSERVERS OF DATA

(75) Inventors: Avner Shafrir, Rehovot (IL); Ehud Shapiro, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 09/825,077

(22) Filed: Apr. 4, 2001

(65) Prior Publication Data

US 2002/0019816 A1 Feb. 14, 2002

Related U.S. Application Data

(63) Continuation of application No. 09/074,527, filed on May 7, 1998, now abandoned, which is a continuation-in-part of application No. 08/827,845, filed on Apr. 11, 1997, now Pat. No. 5,819,084, which is a continuation of application No. 08/236,293, filed on May 2, 1994, now abandoned.

(51) Int. Cl.[7] .............................................. G06F 17/30
(52) U.S. Cl. ........................ 707/2; 707/102; 709/201
(58) Field of Search ...................... 707/2, 102; 709/201

(56) References Cited

U.S. PATENT DOCUMENTS

| 4,775,934 A | 10/1988 | Houri et al. |
| 5,008,853 A | 4/1991 | Bly et al. |
| 5,159,669 A | 10/1992 | Trigg et al. |

(List continued on next page.)

FOREIGN PATENT DOCUMENTS

| GB | 2289149 A | 11/1995 |

OTHER PUBLICATIONS

Leigh J. et al. Supporting Transcontinental Collaborative Work in Persistent Virtual environments. IEEE Computer Graphics and Applications, vol. 16. No. 4, pp. 47–51, Jul. 1996. See whole document.

Gross T. et al. Computer–Supported Cooperative Work and the Internet. Proceedings of Seventh International Conference and Workshop on Database and Expert Systems Applications, pp. 425–430, IEEE 09–10 Sep. 1996. See whole document.

Whittaker S. et al. Co–Ordinating Activity: an Analysis of Interaction in Computer–Supported Co–Operative Work. CHI'91. Conference Proceedings, pp. 361–367. Apr. 27–May 2, 1991. See whole document.

(List continued on next page.)

Primary Examiner—Wayne Amsbury
(74) Attorney, Agent, or Firm—Eitan, Pearl, Latzer Cohen Zedek, LLP

(57) ABSTRACT

A data retrieval system has a data server, a co-presence server and at least one awareness co-presence client. The data server retrieves at least one data object from among a plurality of data objects stored in a data repository. The co-presence server opens communication and observation channels associated with at least one of the data objects. The awareness co-presence clients communicate with the co-presence server and define an awareness state of the client. The co-presence server opens a communication channel or an observation channel with each client depending on the awareness state of each client per retrieved data object. For observation channels, the co-presence server indicates to each client which other clients have retrieved the same data object. The co-presence server opens a communication channel associated with a retrieved data object to those clients which retrieved the data object and which are in a communication type of awareness state.

12 Claims, 5 Drawing Sheets

U.S. PATENT DOCUMENTS

| | | | |
|---|---|---|---|
| 5,220,657 A | | 6/1993 | Bly et al. |
| 5,222,221 A | | 6/1993 | Houri et al. |
| 5,224,095 A | * | 6/1993 | Woest et al. ............... 370/401 |
| 5,337,407 A | | 8/1994 | Bates et al. |
| 5,347,306 A | | 9/1994 | Nitta |
| 5,388,196 A | | 2/1995 | Pajak et al. |
| 5,408,470 A | | 4/1995 | Rothrock et al. |
| 5,452,299 A | | 9/1995 | Thessin et al. |
| 5,511,196 A | | 4/1996 | Shackelford et al. |
| 5,608,649 A | * | 3/1997 | Gopinath et al. ........... 709/242 |
| 5,625,809 A | | 4/1997 | Dysart et al. |
| 5,627,978 A | | 5/1997 | Altom et al. |
| 5,634,124 A | | 5/1997 | Khoyi et al. |
| 5,659,596 A | * | 8/1997 | Dunn ........................ 455/456 |
| 5,819,084 A | * | 10/1998 | Shapiro et al. .............. 707/10 |
| 5,826,022 A | * | 10/1998 | Nielsen ..................... 709/206 |
| 5,864,874 A | * | 1/1999 | Shapiro ..................... 707/201 |
| 5,960,173 A | * | 9/1999 | Tang et al. ................. 709/201 |
| 5,982,390 A | * | 11/1999 | Stoneking et al. .......... 345/474 |
| 6,039,688 A | * | 3/2000 | Douglas et al. ............. 600/300 |
| 6,106,395 A | | 8/2000 | Begis |
| 6,167,451 A | * | 12/2000 | Stracke, Jr. ................. 709/230 |
| 6,243,714 B1 | * | 6/2001 | Shapiro et al. ............. 707/201 |
| 6,453,327 B1 | * | 9/2002 | Nielsen ..................... 715/500 |
| 6,484,196 B1 | * | 11/2002 | Maurille .................... 709/206 |
| 2003/0051136 A1 | * | 3/2003 | Curtis et al. ................ 713/163 |

OTHER PUBLICATIONS

Masinter et al., "Collaborative Information Retrieval: Gopher from MOO" Proc. INET '93, pp. DFA–1—DFA–9.

"Frequently Asked Questions: Basic Information about MUDs and MUDing", Jun. 14, 1993.

Mark Clarkson, Welcome to my fantasy—a personal tour through "Shared Consensual Hallucinations" on the Internet, pp. 36–39, Computer Gaming World, V123, Oct. 1994.

* cited by examiner

CO-PRESENCE DATA RETRIEVAL SYSTEM WHICH INDICATES OBSERVERS OF DATA

CROSS-REFERENCE TO RELATED APPLICATIONS

This application is a continuation of U.S. patent application Ser. No. 09/074,527, filed May 7, 1998, now abandoned, which is a Continuation-in-part of U.S. patent application Ser. No. 08/827,845, filed Apr. 11, 1997, now U.S. Pat. No. 5,819,084, which is a continuation of U.S. patent application Ser. No. 08/236,293, filed May 2, 1994 now abandoned, all of these aforementioned patent applications incorporated by reference herein.

FIELD OF THE INVENTION

The present invention relates to data retrieval systems generally and to data retrieval systems with co-presence mechanisms in particular.

BACKGROUND OF THE INVENTION

Data retrieval systems are known in the art. A typical one is shown in FIG. 1 to which reference is now made. Data retrieval systems typically consist of a data server 10 and multiple data-retrieval clients 12 which are typically separate computers. Upon command of a data-retrieval client 12, the data server 10 accesses a data repository 14, or database, that contains data objects 16 therein. Data objects 16 are typically files of information. The data-retrieval clients 12 also communicate with a user 17, typically through an interactive display 18.

A typical data retrieval operation, depicted in FIG. 2 to which reference is now made proceeds as follows: upon receipt of an instruction (arrow 1) from the user 17 to retrieve a certain data object 16, the data-retrieval client 12 sends (arrow 2) a request to the data server 10 on which the object resides. The data server, 10 retrieves the requested data object 16 (arrow 3) from the data repository 14 and sends the object 16 back (arrow 4) to the data-retrieval client 12. The data-retrieval client 12 then displays (arrow 5) the retrieved data object 16 to the user 17.

Additional features incorporated in a data retrieval system may include a data-management mechanism that allows a data-retrieval client 12 to create a new data object 16, to modify a retrieved data object 16 and to send the created or modified data object 16 back to the data server 10 for storage in the data repository 14, and a permission mechanism that allows the server 10 to approve or deny certain client requests.

Examples of data retrieval systems, some of which include the additional features, include the file transfer protocol (FTP), hypertext transfer protocol (HTTP), Gopher and network file systems (NFS) standards, network news servers (NNTP), DEC Notes of Digital Electric Corporation of the USA, Lotus Notes of Lotus Inc. of the USA, Novell NetWare of Novell Inc. of the USA, and the relational database management systems (RDBMS) such as those manufactured by Oracle, Sybase, and Informix, all of the USA.

SUMMARY OF THE PRESENT INVENTION

There is provided, in accordance with a preferred embodiment of the present invention, a data retrieval system has a data server, a co-presence server and at least one awareness co-presence client. The data server retrieves at least one data object from among a plurality of data objects stored in a data repository. The co-presence server opens communication and observation channels associated with at least one of the data objects. The awareness co-presence clients communicate with the co-presence server and define an awareness state of the client. The co-presence server opens a communication channel or an observation channel with each client depending on the awareness state of each client per retrieved data object. For observation channels, the co-presence server indicates to each client which other clients have retrieved the same data object. The co-presence server opens a communication channel associated with a retrieved data object to those clients which retrieved the data object and which are in a communication type of awareness state.

Additionally, in accordance with a preferred embodiment of the present invention, for a data object retrieved by the data server for one of the awareness co-presence clients, the co-presence server indicates to the one client which other clients have retrieved the same data object and provides a communication channel associated with the retrieved data object to those clients which retrieved the data object and which are in a communication type of awareness state.

Moreover, in accordance with a preferred embodiment of the present invention the co-presence server generates one virtual place per data object retrieved from the data server, associates each virtual place with its data object once its data object is accessed and generates communication and observation channels to awareness co-presence clients in response to the awareness state of each the client.

Further, in accordance with a preferred embodiment of the present invention, the awareness co-presence client associates a data object received from the data server with one of the at least one virtual places in the co-presence server.

Finally, in accordance with a preferred embodiment of the present invention, the awareness state is one of: public observation, private observation and communication.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 3:
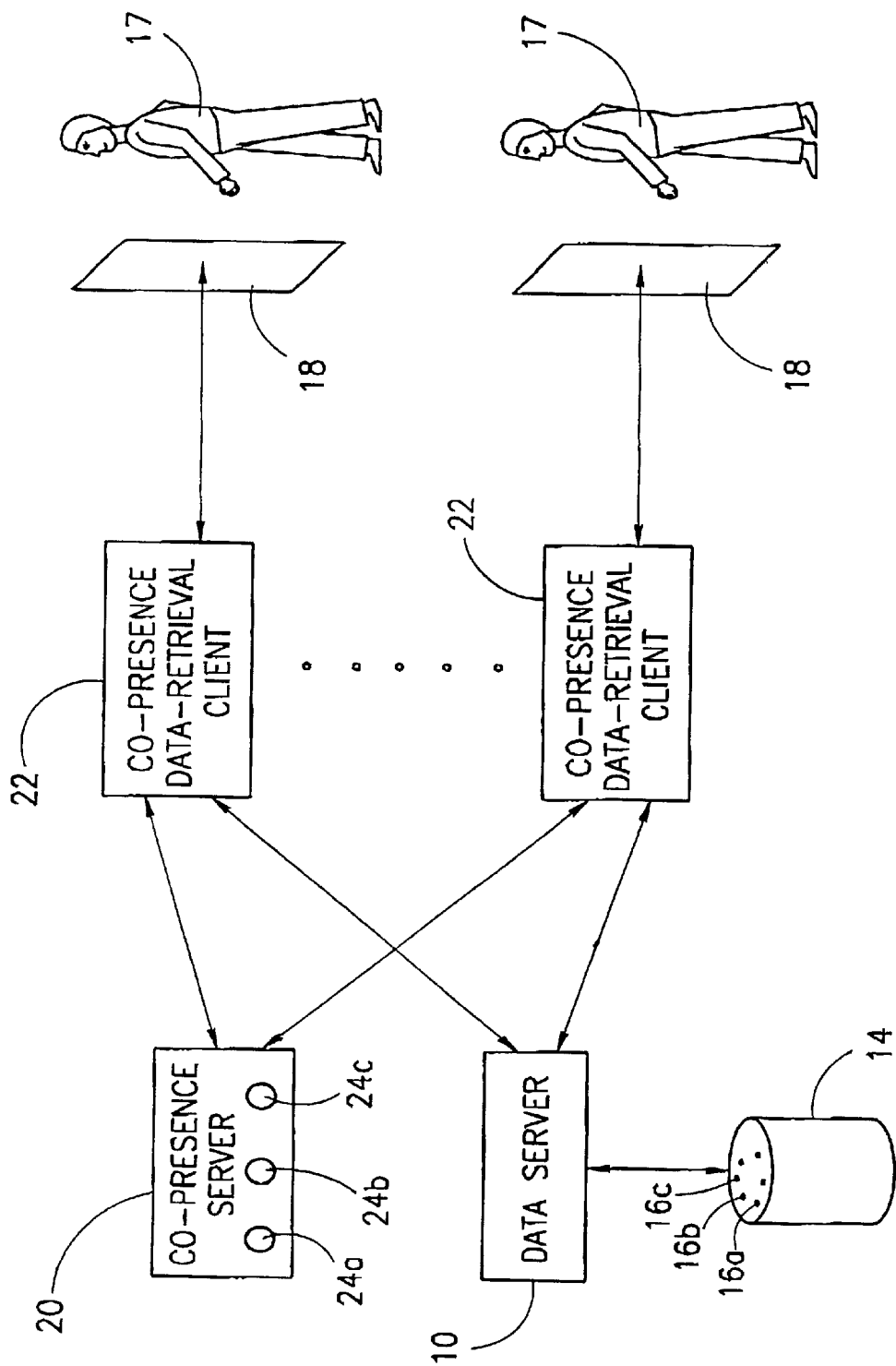
FIG. 3 is a schematic illustration of a data retrieval system with a co-presence server, constructed and operative in accordance with a first preferred embodiment of the present invention.
Figure 4:
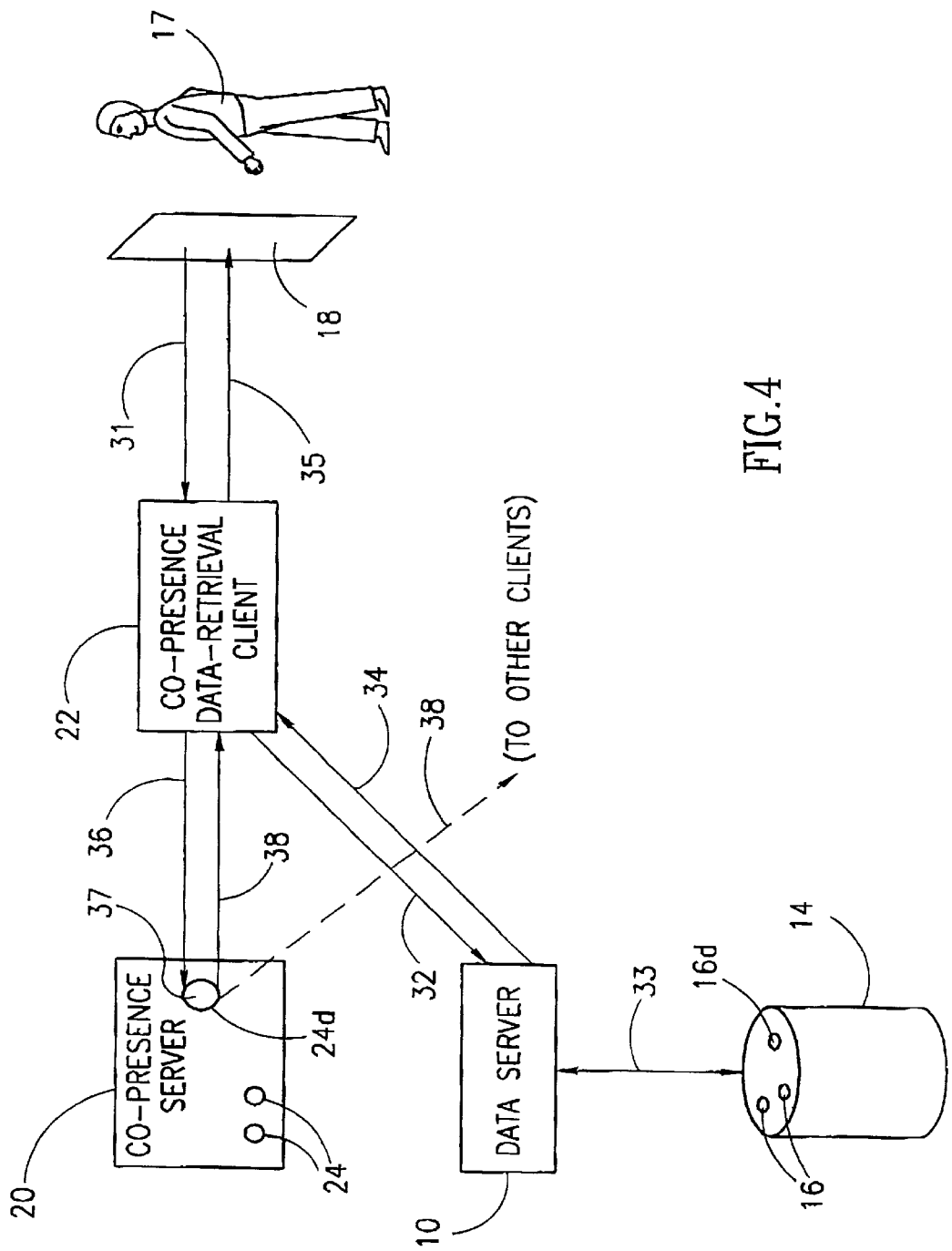
FIG. 4 is a schematic illustration of a co-present data retrieval operation.

Reference is now made to FIGS. 3 and 4 which illustrate the data-retrieval system of the present invention. The system of the present invention typically comprises data server 10 and data repository 14 as in the prior art. It also comprises, in accordance with a preferred embodiment of the present invention, a co-presence server 20 and a multiplicity of co-presence data-retrieval clients 22 each communicating with data server 10, co-presence server 20, and, through the associated display 18, with a user 17.

As in the prior art, each data-retrieval client 22 requests a data object 16 a through the data server 10 which retrieves the requested data object 16 from the data repository 14. In addition, in accordance with a preferred embodiment of the present invention, at the same time, the co-presence data-retrieval client 22 also informs the co-presence server 20 that it has retrieved a specific data object 16, for example object 16a. In response, the co-presence server 20 adds the data-retrieval client 22 to a virtual place 24 associated with the retrieved data object 16a. Client 22 associates virtual places 24a–24c with retrieved data objects 16a–16c.

For the purposes of clarity of discussion, we will state that the co-presence server 20 maintains a virtual place 24 for each data object 16 stored in the data server 10. It will be appreciated that the co-presence server 20 can also create a virtual place 24 on demand, when the first user becomes present at the data object 16, and can remove the virtual place 24 when no one is present.

All users which access a data object 16 via data-retrieval client 22 are added to the virtual place 24 associated with the data object 16 that they accessed. In addition, co-presence server 20 provides each virtual place 24 with inter-user communication capabilities such that any user which accesses a data object 16 can communicate, if he so desires, with the other users which are currently utilizing the same data object 16. The co-presence server 20 allows a user 17 who is present at a data object 16 to become aware of other co-present users 17 and provides a means for co-present users 17 to communicate with each other in real time. The communication between users 17 can also be client-to-client if communication through the co-presence server 20 is slow.

The co-presence server 20 essentially turns each data object into a virtual place where users 17 can meet to view the data object 16, to modify it, and to discuss it. For example, if a data server 10 contains user manuals for a certain product, then it might be useful for the product's vendor to place a helpdesk person at the virtual place, or places, associated with the user manuals. The help-desk person can then assist, in real-time, those users who access the user manuals, if they need additional assistance or have difficulties "finding their way" through the product's documentation.

The co-presence server 20 and the co-presence data-retrieval client 22 follow a co-presence protocol which is illustrated with arrows 31–38 of FIG. 4.

Figure 1:
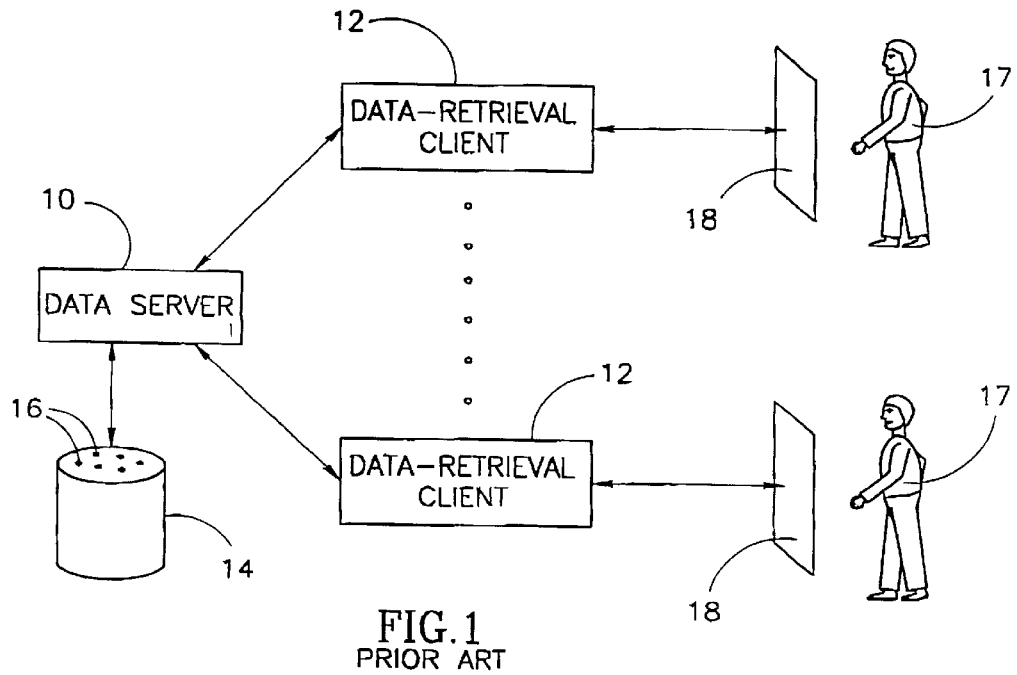
FIG. 1 is a schematic illustration of a prior art data retrieval system.
Figure 2:
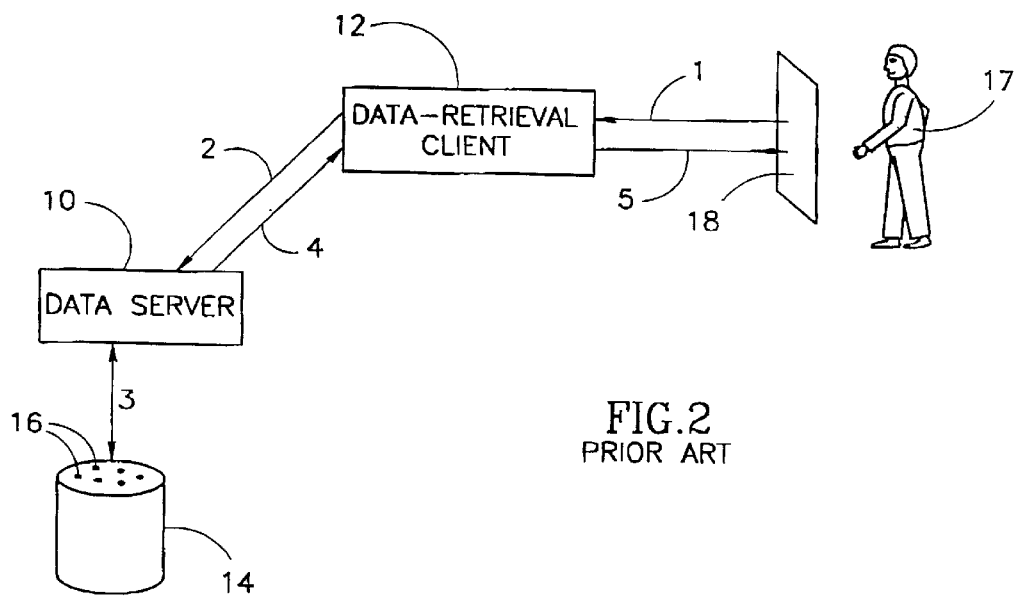
FIG. 2 is a schematic illustration of one prior art data retrieval operation.

A user 17 retrieves a data object 16d from a certain data server 10 in accordance with the protocol described in the prior art (arrows 31–35, similar to arrows 1–5 of FIG. 2). At the same time, the co-presence data-retrieval client 22 sends (arrow 36) a message to virtual place 24d within the co-presence server 20 which is associated with the data object 16d, to the effect that the user has accessed the data object 16d. (Typically, the data objects 16 have well-defined names on the data server 10. Clients 22 utilize the same or corresponding names to identify the corresponding virtual places 24). Tee virtual place 24d then adds (step 37) the user to the list of co-present users, and sends a message (arrow 38) to that effect to all co-present users, including to the user which just joined the virtual place 24d.

When a user 17 present at a data object 16 wishes to send a message to selected ones of the co-present users 17, the first user 17 sends a message to that effect, via co-presence data-retrieval client 22 and the co-presence server 20, to the associated virtual place 24 which, in turn, relays the message to the selected users 17 present at the data object 16.

When a user 17 ceases to be present at a data object 16 (either due to the retrieval of another data object 16 from the same or another data server 10 or due to closure of its co-presence data-retrieval client 22), the co-presence data-retrieval client 22 sends a message (arrow 36) to that effect to the virtual place 24 which, in turn, deletes the user 17 from the list of co-present users. Virtual place 24 then sends a message (arrow 38) to all remaining co-present users 17 notifying them of the event.

The co-presence protocol can be described by the operations performed by the co-presence data-retrieval client 22 and by the co-presence server 20 and virtual place 24. The following pseudocode describes the protocol:

For the client 22 of user U:
Assume user U already has document D1 from server S1.
When user U requests document D2 from server S2:
1. Attempt to retrieve document D2 from server S2;
2. If the retrieval is successful, send the following message to the virtual place P(D1) in co-presence server C(S1) corresponding to document D1: "U left for virtual place D2 in server S2".
When user U requests to say text T:
send the message "U said T" to the co-presence server C(S2).
Upon receipt of message "User V entered (or left) for (from) virtual place P(D1) in server Sk":
display to user U the current list of users in the virtual place.
Upon receipt of the message "V said T":
display to user U the message "V said T".
For the virtual place P(Di) on co-presence server C(Si)
Let the set of co-present users be CP:
Upon receipt of message "U left for virtual place P(Dj) in server Sk:
1. Delete user U from the set CP of co-present users
2. Send to every remaining user V in CP the message: "U left for virtual place P(Dj) in server Sk
Upon receipt of the message "U entered from virtual place P(Dj) in server Sk:
1. Add user U to the set CP of co-present users
2. Send to every user V in the set CP of co-present users the message "U entered from virtual place P(Dj) in server Sk.
Upon receipt of message "U said T"
Send the message "U said T" to every user in the set CP of co-present users, The co-presence server 20 can be implemented in any way which provides co-presence. In one embodiment, the co-presence server 20 is implemented as a UNIX process, executing a concurrent programming language called flat concurrent Prolog (FOP). Using an FCP internal lightweight process mechanism, as described in U.S. Pat. No. 5,222,221 to Houri et al. which is hereby incorporated by reference, each virtual place 24 can be implemented as a place process, each formed of a collection of FCP processes. Each FCP process obeys the co-presence protocol described hereinabove.

The co-presence server 20 receives communications on a pre-assigned and published port whose identity is incorporated in the co-presence data-retrieval client 22. The co-presence server 20 typically receives messages from the co-presence data-retrieval clients 22 and provides them to the appropriate virtual place 24. In addition, if desired, the managing UNIX process (the co-presence server 20) can also create a featherweight process (virtual place 24) whenever a first user accesses a data object 16 and can remove a process whenever there cease to be users co-present at the relevant virtual place 24.

It will be appreciated that, because communication with the co-presence server 20 is separate from the data-retrieval operations, the data-retrieval system of the present invention can operate with standard data-retrieval clients 12 which do not have any co-presence capability.

It will further be appreciated that the system of the present invention can easily be created from an existing prior art data-retrieval system. The upgrading process involves adding a co-presence server 20, as described hereinabove, and modifying the data-retrieval clients 12 to become co-presence data-retrieval clients 22 through the addition of the following capabilities:

a) the ability to open an additional communication channel with the co-presence server 20, b) the ability to map data objects 16 to virtual places 24;

c) the ability to display co-presence information;

d) the ability to enable users 17 to communicate in real time; and e) the ability to notify the co-presence server 20 when the client 22 is terminated or closed down.

It will be appreciated that data-retrieval clients which have not been upgraded can still operate within the data-retrieval system of FIGS. 3 and 4.

Figure 5:
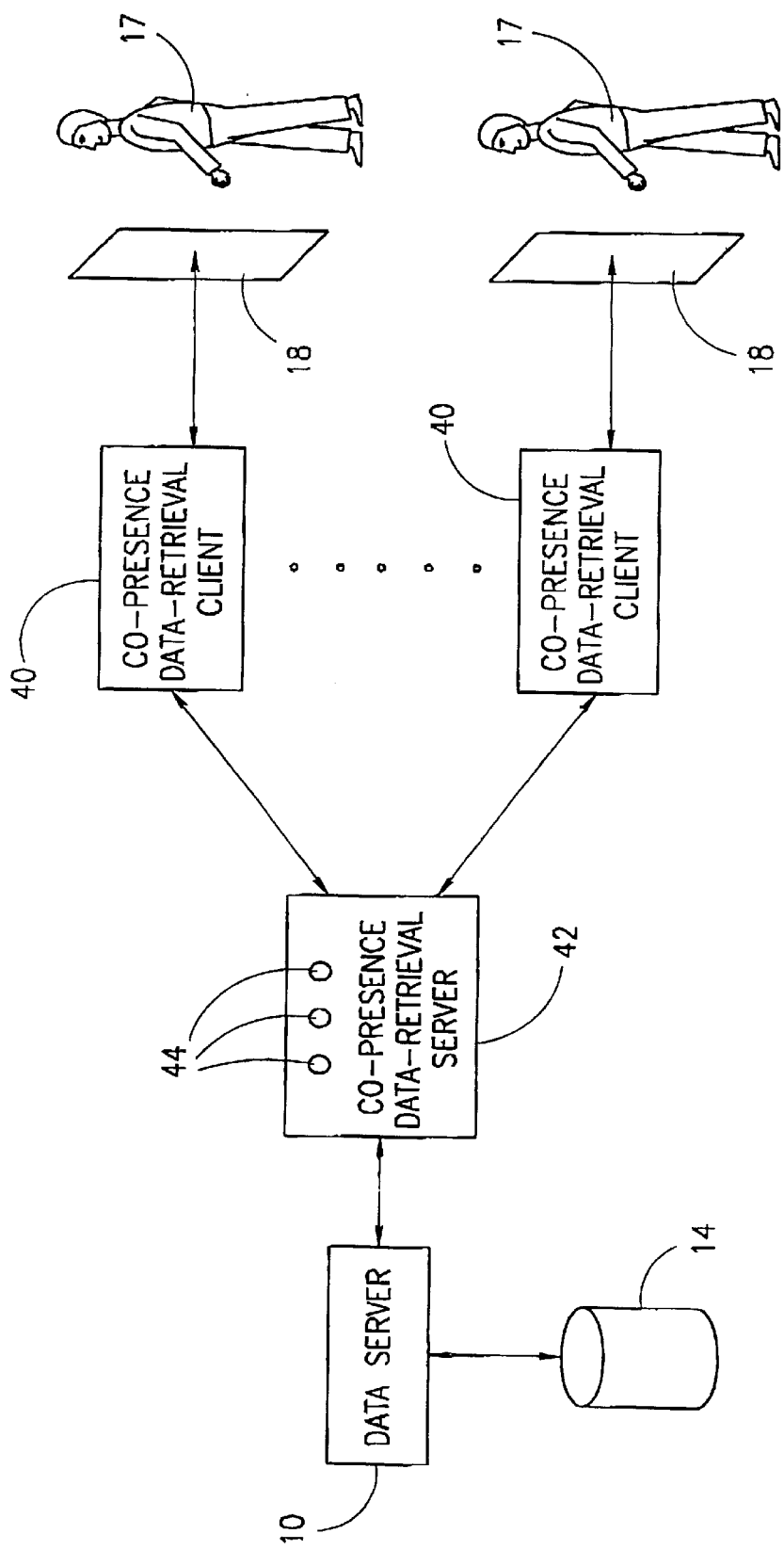
FIG. 5 is a schematic illustration of an alternative embodiment of a co-present data-retrieval system and its operation.

Reference is now made to FIG. 5 which illustrates an alternative embodiment of the present invention. In this embodiment, the data-retrieval system comprises the same elements but they are configured in a different manner. Specifically, the data-retrieval system comprises co-presence data-retrieval clients labeled 40, and a co-presence data-retrieval server 42, as well as data server 10 and data repository 14 as in the prior art.

In this alternative embodiment, the co-presence data-retrieval clients 40 communicate only with the co-presence data-retrieval server 42, providing to it their data retrieval requests which the server 42, in turn, passes to the data server 10, and their co-presence communication. The co-presence data-retrieval server 42 includes virtual places 44. There can also be many servers 42, each of which handles data retrieval requests for its associated data server 10.

The following is a pseudo code describing the protocol between clients 40 and server 42:

For client 42 of user U:
    Assume user currently has document D1 in server S1.
    When user requests document D2 from server S2:
        1. Send message "U requests to enter from place P(D1) in server S1" to place P(D2) in co-presence server C(S2)
        2. If data-retrieval is successful, send the message "U Left for place P(D2) in server S2" to place 1(D1) in co-presence server C(S1)
    When user U requests to say text T:
        Send the message "U said 1" to the co-presence server C(S2)
    Upon receipt of message "V entered (left) for (from) place Dj in server Si":
        Display to the user U the current co-present users in the place P(Dj)
    Upon receipt of message "V said T";
        Display to the user U the message from user V.

For the virtual place P(Di) on co-presence server C(Si)
    Let the set of co-present users be CP:
    Upon receipt of message "U left for virtual place P(Dj) in server Sk":
        1. Delete user U from the set CP of co-present users
        2. Send to every remaining user V in CP the message "U left for virtual place P(Dj) in server Si"
    Upon receipt of the message "U requests to enter from virtual place P(DJ) in server Sk":
        1. Attempt to retrieve data from data server 10
        2. If successful:
            a. Send the data to client 42 of user U
            b. Add user U to the set CP of co-present users
            c. Send to every user V in the set CP of co-present users the message "U entered from virtual place P(Di) in server Si".
    Upon receipt of message "U said T"
        Send the message "U said T" to every user in the set CP of co-present users.

In the previous embodiments, the co-presence data retrieval client placed the user in communication with the other user's at the data object as soon as the user retrieved to the data object. This is similar to walking into a room and having to talk with everyone before knowing how many and who the people in the room are.

Figure 6:
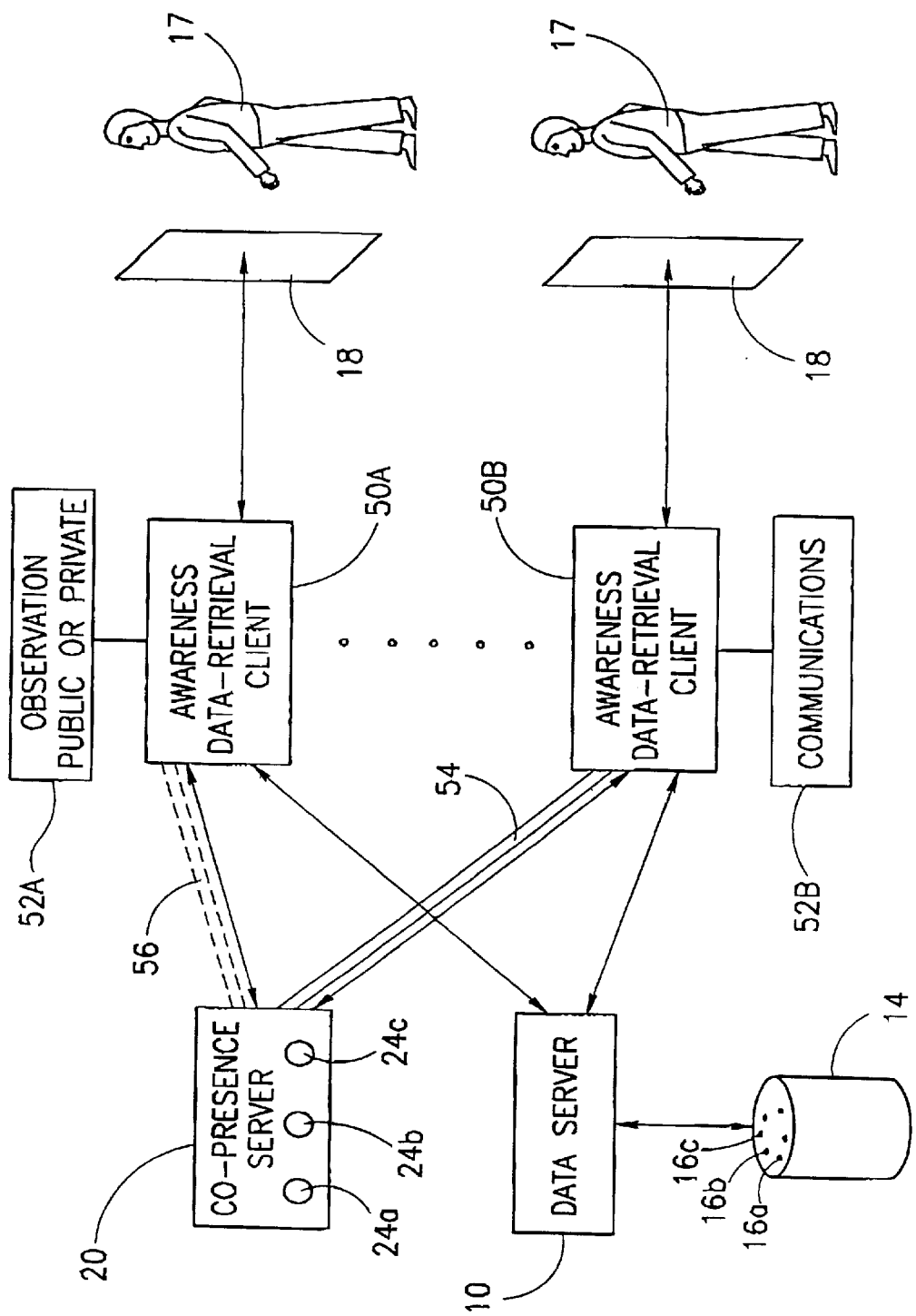
FIG. 6 is a schematic illustration of a further alternative embodiment of a co-present data-retrieval system and its operation

Reference is now made to FIG. 6 which illustrates an alternative embodiment of the present invention in which the user can define an awareness state by which he is aware of the people who had requested the same data object 16. FIG. 6 is similar to FIG. 3, and thus, similar reference numerals refer to similar elements, except that the data retrieval clients are awareness data retrieval clients 50 which have two, mutually exclusive, states 52 of awareness associated therewith. FIG. 6 shows two clients 50*a* and 50*b* which, respectively, have the states of observation (52*a*) and communication (52*b*) associated therewith with respect to the same data object. If desired, the state of observation can be defined as either public or private.

If the user is defined as in the communication state, the co-presence system operates as described hereinabove wherein a message is sent to all other users when a new user requests the same data object. The new user joins the associated virtual place 24 and the communication channel is opened to that user. The new user can then send and receive messages with the other users who are in the communication state.

In the observation state, an observation channel, but no communication channel, is opened in which the user receives an indication of (i.e. is aware of) how many and which people are at the virtual place. When new people retrieve the same data object, the indication is updated. The indication only includes information regarding public observers; private observers will receive the indication and its update but are not listed therein.

Although not shown in FIG. 6, at any time the user can define in his client a list of data objects of interest. Associated with each data object is an awareness state. Thus, the user can have multiple channels, some for communications and some for observation. For each, the user will be aware of any change regarding the users associated with these data objects.

For both states, a list of who is currently publicly at the virtual place, and in which state, can be retrieved. Typically, the identification is by email address or by some other name.

In this embodiment, when the user requests a data object, the client 50 sends his request to the data server 10 which retrieves the object and returns it to the client 50. Client 50 also sends a message to the associated virtual place 24 within the co-presence server 20 which is associated with the retrieved data object 16, to the effect that the user has accessed the data object 16. For this embodiment, the message includes the awareness state 52 of the user, for that data object 16. The virtual place 24 then adds the user, and its awareness state, to the list of co-present users. For client 50b, whose awareness state 52b is that of communication, the virtual place 24 opens a communication channel 54, shown in solid lines, thereto.

For client 50a, the virtual place 24 opens an observation channel 56 and sends along it the number and/or the list of names of the users at the virtual place 24 which are communicating and the number and/or the list of names of the users which are publicly observing. At any time, the user can redefine his awareness state for that data object and the virtual place at which he is present will change the channel (communication or observation) accordingly.

At any time, a user can request a list of users currently at the virtual place along with an indication of their awareness state. With this information, a user can 'scope out' the virtual place before deciding to begin communication.

It will be appreciated by persons skilled in the art that the present invention is not limited to what has been particularly shown and described hereinabove. Rather the scope of the present invention is defined by the claims which follow:

We claim:

1. A co-presence server comprising:
    means for generating one virtual place per data object retrieved from a data server and for associating each virtual place with its data object once its data object is accessed;
    means for providing each virtual place associated with each retrieved data object with communication and observation channels for at least two users that access said data object and for associating said at least two users with one or the other of said channels in accordance with a user-defined awareness state.

2. A server according to claim 1 and wherein said user-defined awareness state is one of: public observation, private observation and communication.

3. A server according to claim 1 and wherein said means for providing comprises means for generating communication and observation channels to awareness co-presence clients associated with said users in response to said user-defined awareness state of each said associated user.

4. A server according to claim 1 and wherein said means for providing comprises means for indicating to one user which other users have retrieved the same data object.

5. A co-presence data-retrieval client comprising:
    data retrieval means for requesting a data server to retrieve a data object;
    object association means for associating a virtual place with an accessed data object; and
    means for enabling communication and observation between at least two data-retrieval clients that are associated with said at least one virtual place and for associating said at least two data-retrieval clients with one or the other of said channels in accordance with a user-defined awareness state.

6. A client according to claim 5 and wherein said user-defined awareness state is one of: public observation, private observation and communication.

7. A computer product readable by a machine, tangibly embodying a program of instructions executable by the machine to perform method steps for co-presence at a data object, said method steps comprising:
    generating one virtual place per data object retrieved from a data server;
    associating each virtual place with its data object once its data object is accessed;
    providing each virtual place associated with each retrieved data object with communication and observation channels for at least two users that access said data object; and
    associating said at least two users with one or the other of said channels in accordance with a user-defined awareness state.

8. A product according to claim 7 and wherein said user-defined awareness state is one of: public observation, private observation and communication.

9. A product according to claim 7 and wherein said providing comprises generating communication and observation channels to awareness co-presence clients associated with said users in response to said user-defined awareness state of each said associated user.

10. A product according to claim 7 and wherein said providing comprises indicating to one user which other users have retrieved the same data object.

11. A computer product readable by a machine, tangibly embodying a program of instructions executable by the machine to perform method steps for co-presence at a data object for a client, said method steps comprising:
    requesting a data server to retrieve a data object;
    associating a virtual place with an accessed data object;
    enabling communication or observation between at least two data-retrieval clients that are associated with said at least one virtual place; and
    associating said at least two data-retrieval clients with one or the other of said channels in accordance with a user-defined awareness state.

12. A product according to claim 11 and wherein said user-defined awareness state is one of: public observation, private observation and communication.

* * * * *